(12) United States Patent
Ting

(10) Patent No.: US 7,517,237 B2
(45) Date of Patent: Apr. 14, 2009

(54) ELECTRICAL CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/012,922

(22) Filed: Feb. 5, 2008

(65) Prior Publication Data

US 2008/0188134 A1    Aug. 7, 2008

(30) Foreign Application Priority Data

Feb. 5, 2007    (TW) .............................. 96202145 U

(51) Int. Cl.
*H01R 13/62*    (2006.01)
(52) U.S. Cl. .................. 439/159; 439/630; 439/157; 439/160; 235/441
(58) Field of Classification Search ................. 439/630, 439/159, 160, 157; 235/441
See application file for complete search history.

(56) References Cited

U.S. PATENT DOCUMENTS

| 5,653,610 | A | 8/1997 | Broschard |
| 6,296,500 | B1 | 10/2001 | Liao |
| 6,478,590 | B1 * | 11/2002 | Kuo ............................ 439/159 |
| 7,322,839 | B1 * | 1/2008 | Wu et al. ..................... 439/159 |

* cited by examiner

*Primary Examiner*—Javaid Nasri
(74) *Attorney, Agent, or Firm*—Wei Te Chung

(57) ABSTRACT

An electrical card connector includes an insulating housing (2) having a base section (21) and a pair of lateral offsets (22) extending from the opposite ends of the base section, a shell (1) mounted on the insulating housing to define a card slot (5) therebetween for insertion of a card, a terminal module (321) retained in the insulating housing and comprising a plurality of terminals protruding into the card slot, and a pair of elastic pieces (6) mounted on the opposite lateral offsets of the insulating housing, respectively. Wherein each elastic piece protrudes into the card slot and a distance between the elastic pieces is smaller than a width of the inserted card.

4 Claims, 4 Drawing Sheets

ELECTRICAL CARD CONNECTOR

BACKGROUND OF THE INVENTION

1. Field of the Invention

The present invention relates to an electrical card connector, and more particularly to an electrical card connector capable of receiving a card more stably.

2. Description of Prior Arts

Recently, card-in operation type electronic devices have rapidly prevailed for being used on the electronic device to increase the storage, such as a camera, a personal computer, a recording machine or the like so that information from such an electronics device is recorded in the card or information from the card is given to such an electronic device.

In the conventional art, a memory card as mentioned above connects with the electronic device by an electrical card connector placed in the electronic device. The memory card includes a contact or terminal array for connecting electrically with the electrical card connector. Accordingly, the electrical card connector primarily includes a number of terminals for electrically engaging with corresponding contacts of the card, and an insulating housing for retaining the terminals. Therefore, a card slot is defined by the insulating housing for insertion of a card. In many prior arts, a pair of lateral walls of the insulating housing are used as a pair of side rulers to guide the card insertion.

U.S Pat. No. 6,609,919, for example, discloses a card connector in which a card is inserted as described above. However, when the card is inserted completely, a gap is presented between the card and the lateral walls of the insulating housing, if the card connector moves fierily, the card may move away form the right position where the card contacts with the terminals properly. Thus, it is hard to transform information exactly between the card and the card connector.

So, it is an object of the present invention to solve the above described problem.

SUMMARY OF THE INVENTION

An object, therefore, of the invention is to provide an electrical card connector to confirm a card located in a right position where the card contacts with terminals of the electrical card connector properly.

In the exemplary embodiment of the invention, an electrical card connector includes an insulating housing having a base section and a pair of lateral offsets extending from the opposite ends of the base section, a shell mounted on the insulating housing to define a card slot therebetween for insertion of a card, a terminal module retained in the insulating housing and comprising a plurality of terminals protruding into the card slot, and a pair of elastic pieces mounted on the opposite lateral offsets of the insulating housing, respectively. Wherein each elastic piece protrudes into the card slot and a distance between the elastic pieces is smaller than a width of the inserted card.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Embodiments of the present invention will now be described going with FIG. 1 to FIG. 4.

Figure 1:
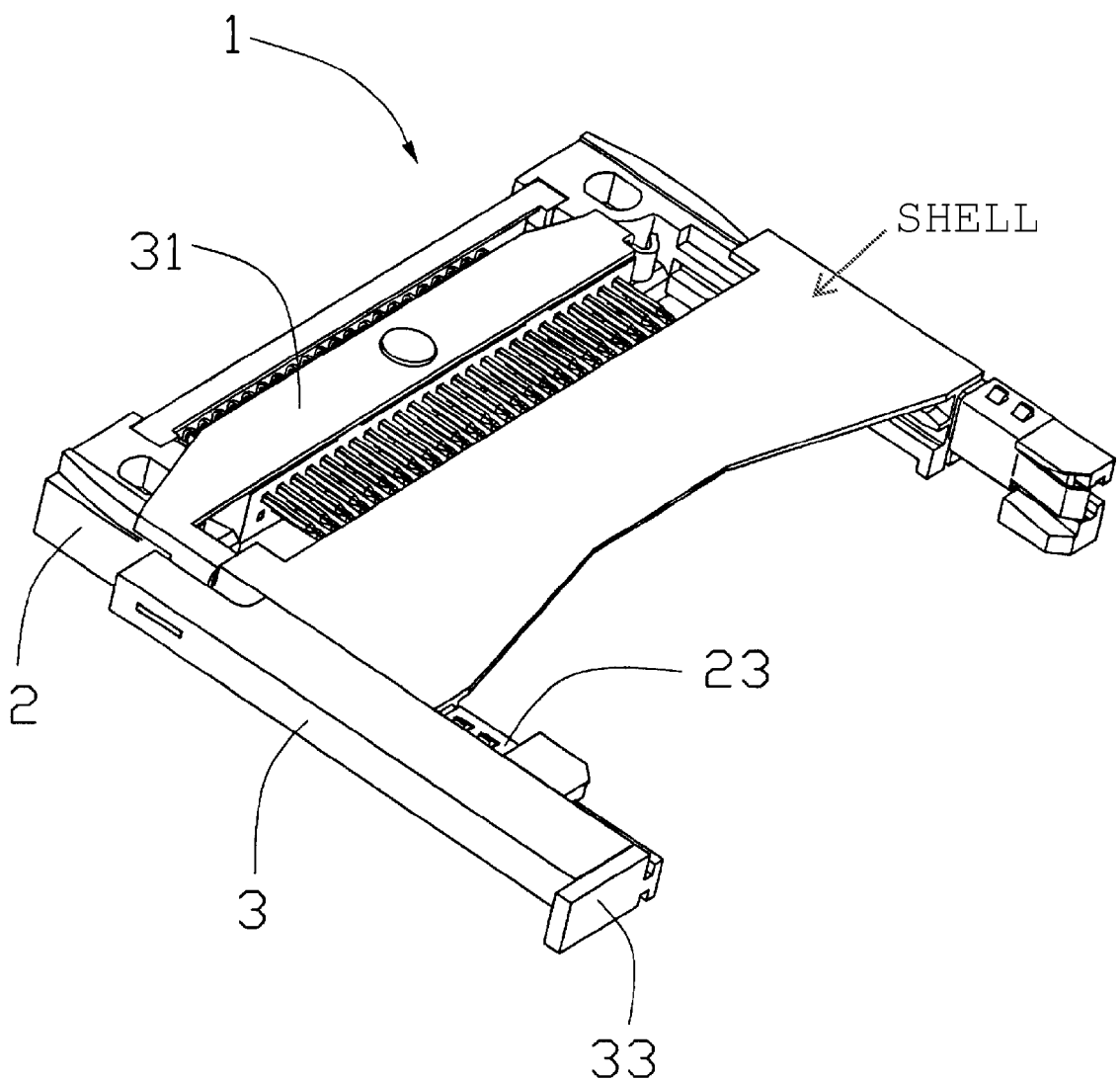
FIG. 1 is a perspective, assembly view of an electrical card connector of the present invention.
Figure 2:
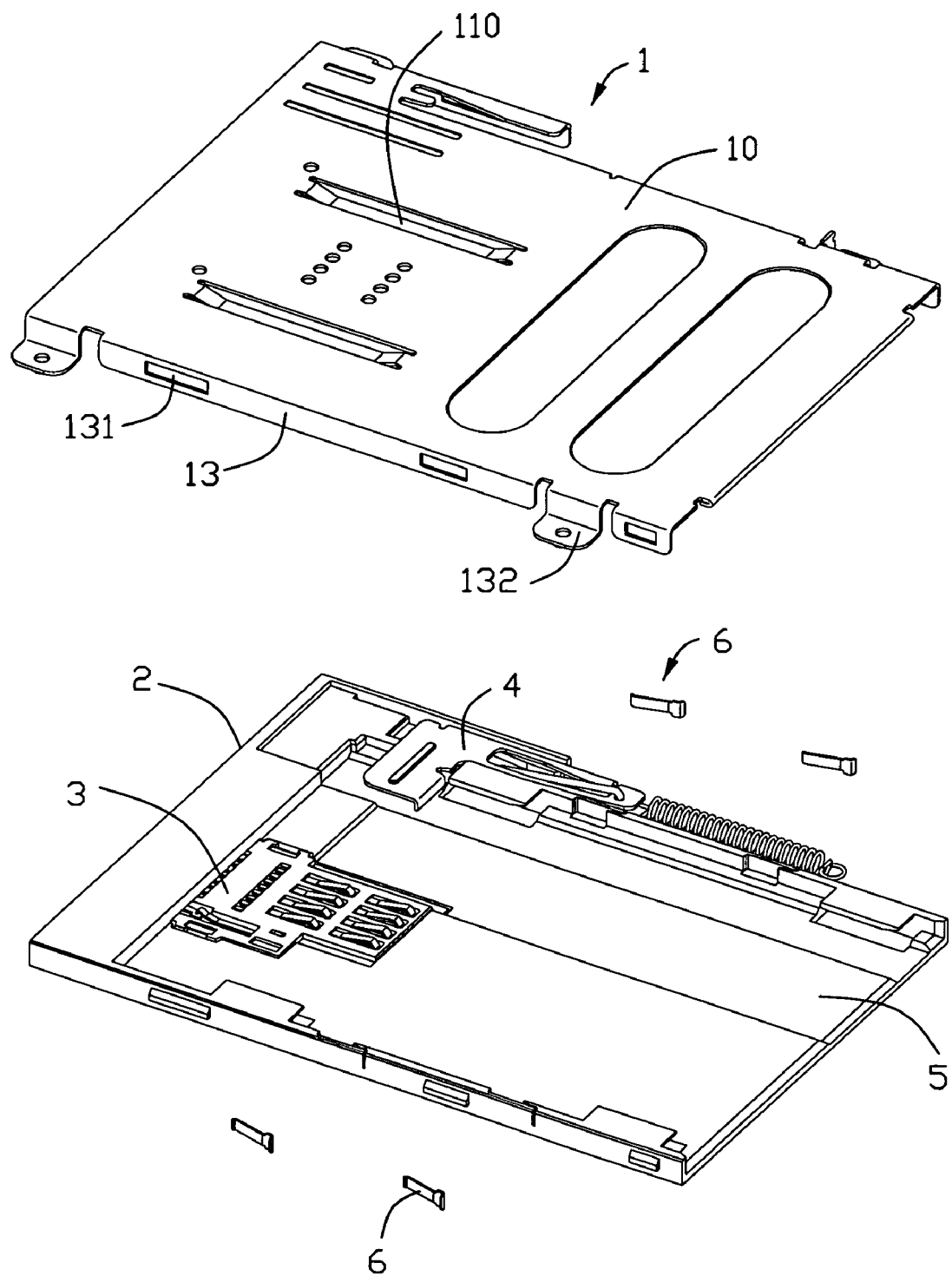
FIG. 2 is a perspective view of a shell, an insulating housing and an elastic piece of the electrical card connector as show in FIG. 1.

As shown in FIG. 1 to FIG. 2, an electrical card connector in accordance with present invention comprises an insulating housing 2, a shell 1 mounted on the insulating housing 2, a terminal module 3 retained in the insulating housing 2, and an ejecting mechanism 4 fixed on a lateral side of the insulating housing 2. The insulating housing 2 associates with the shell 1 defining a card slot 5 for a card insertion. On each lateral side of the insulating housing 2, a pair of elastic pieces 6 are mounted.

Referring now to FIG. 2, the shell 1 of an approximately elongated configuration comprises a body plate 10 and a pair of lateral walls 13 extending downwardly from the body plate 10. On the body plate 10, a pair of pressing pieces 110 are formed integrally thereof and arranged in an up-to-down direction. Each pressing piece 110 has two ends in the card inserting direction connecting with the body plate 10 and a lever surface projecting into the card slot 5 for engaging with an inserted card. Regarding to the lateral walls 13, each has a plurality of locking holes 131. Near to the rear end and the front end of each lateral wall 13, a plurality of position plates 132 are formed, respectively, to place the shell 1 on a printed circuit board (not shown).

The insulating housing 2 has a base section 21, a pair of lateral offsets 22 extending forwardly from the opposite ends of the base section 21, and a bottom plate (not labeled) connecting the lateral offsets 22 with each other. The bottom plate defines a first bottom plate 23 and a second bottom plate 24. The upper surface of the first bottom plate 23 is higher than that of the second bottom plate 24. On the first bottom plate 23, a receiving hollow 230 is defined according to the configuration of the terminal module 3. Corresponding to the locking hole 131 of the shell 1, a plurality of embossments 222 are formed on each lateral offsets 22.

Each lateral offset 22 forms a plurality of guiding plates 223 for card inserting. The guiding plates 223 each protrudes into the card slot 5 horizontally, and a space (not labeled) is defined according to a card height between two opposite guiding plates 223. Thus, the card can be inserted and guided by the guiding plate 223. Each lateral offset 22 further has two pairs of receiving channels 221. The receiving channels 221, communicating with the card slot 5, each has a gap 224 extending outwardly therefrom.

Figure 3:
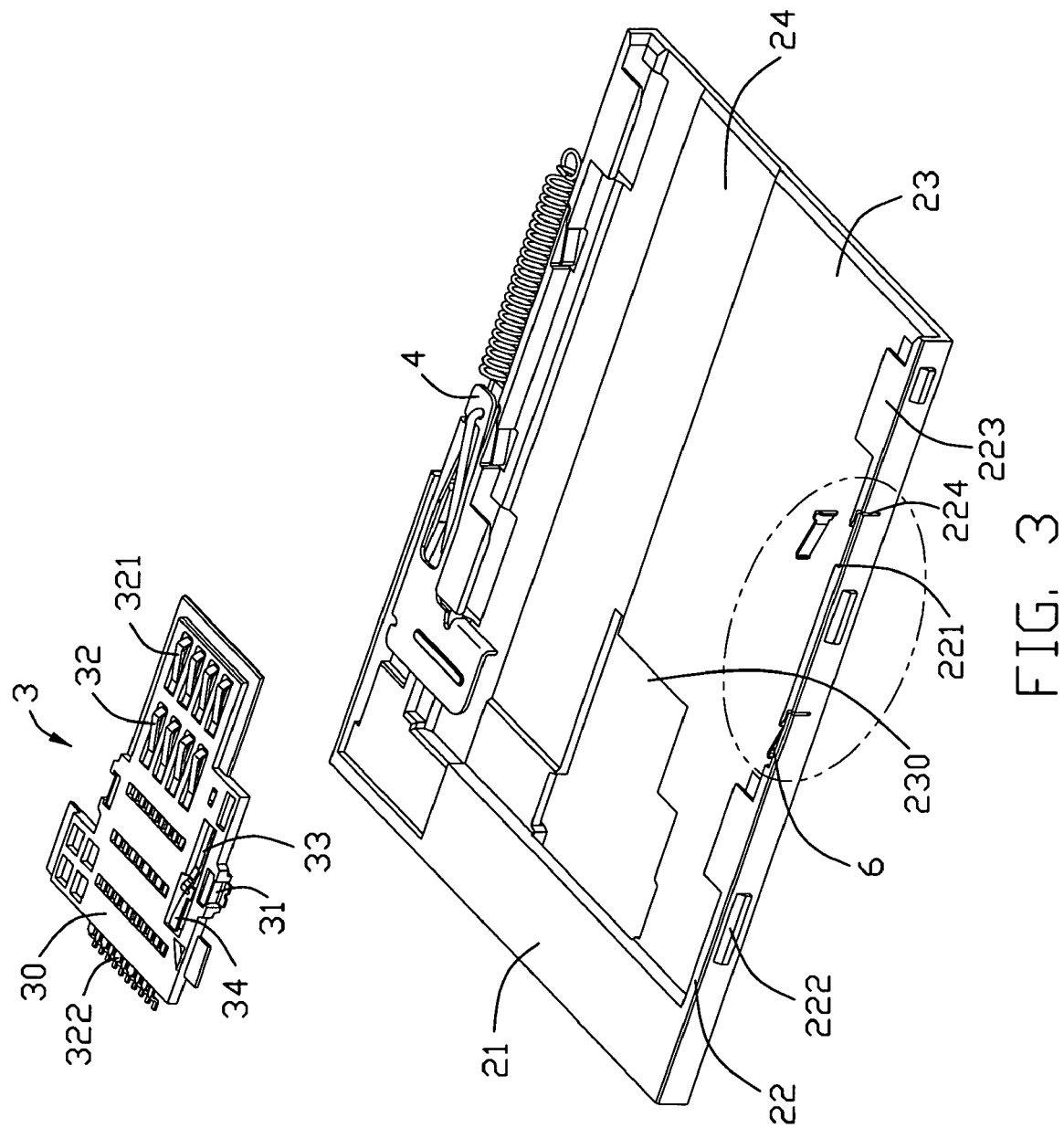
FIG. 3 is a perspective view of the insulating housing and the terminal module.

As shown in FIG. 3, the terminal module 3, received in the receiving hollow 230, comprises a plurality of terminals 32, a detecting switch 33 and 34 for detecting a card inserted completely or not, and a fixing body 30 for assembling the terminals 32 and the detecting switch 33 and 34. On the opposite sides of the fixing body 30, a pair of position pieces 31 are located to allow the terminal module 3 to be located on the printed circuit board. The terminals 32 are retained in the fixing body 30 and project into the card slot 5. Each terminal 32 includes an engaging portion 321 for engaging with an insertion card, a fastening portion (not labeled) buried in the fixing body 30, and a soldering portion 322 protruding beyond the end surface of the fixing body 30 for soldering on the printed circuit board.

Figure 4:
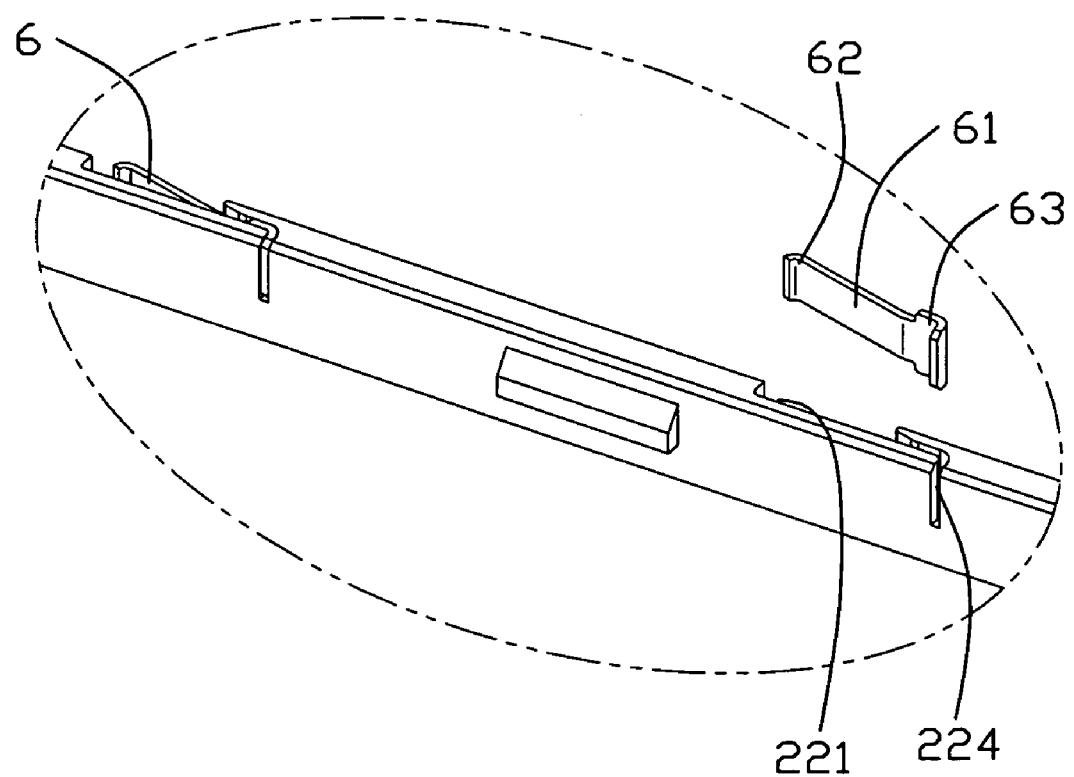
FIG. 4 is an enlarging view of this invention shown with the broken line in FIG. 3.

As shown in FIG. 4, each elastic piece 6, made of metallic material and capable of distortion subject to the card inserted or ejected, comprises a spring part 61, a colliding part 62 extending from one end of the spring part 61 for engaging with the card, and a fixing part 63 extending outwardly from the other end of the spring part 61 according to the configuration of the gap 224 of the receiving channel 221.

Together with FIG. 1 to FIG. 4, the relationship of the elements of the electrical card connector as mentioned above will be illustrated in following segments. The terminal module 3 is located in the receiving hollow 230 of the first body plate 23 with the upper surface of the fixing body 30 in a same level or face with that of the first body plate 23. The embossments 222 of the insulating housing 2 lock with corresponding locking holes 131 of the shell 1 to retain the shell 1 on the insulating housing 2, thereby the card slot 5 is defined by the insulating housing 2 and the shell 1. Then the terminals 32 and the detecting switch 33 project into the card slot 5, the switch 34 partially placed under the switch 33 rightly. Nicely, the pressing pieces 110 of the shell 1 is located rightly above the terminal module 3 to press on the insertion card in order to achieve a reliably connection between the card and the terminals 32. Normally, the detecting switch 33 and 34 is separated with each other, when a card is inserted completely, the switch 34 moves down to engaging with the other switch 33 by pressure of the insertion card.

FIG. 4 shows the relationship between the elastic pieces 6 and the insulating housing 2 more detaildly. The elastic pieces 6 are received resiliently in corresponding receiving channels 221 in such way that the fixing part 63 is retained in the gap 224 of the receiving channel 221, and the colliding part 62 projects into the card slot 5 for engaging with a card. For making the insertion card retained stably, two elastic pieces 6 placed on one lateral offset 22 are opposite to corresponding elastic pieces 6 placed on the other lateral offset 22. In addition, with respect to the card insertion direction, a transverse direction is defined. The transverse distance between the opposite colliding part 62 is smaller than the width of the card. When the card is inserted, the elastic piece 61 is pressed by the card and moves outwardly, till completely insertion, the elastic piece 61 is completely received in the receiving channel 221, and the card engages with the terminals 32 and the switch 33. Then both lateral sides of the card engage with each colliding part 62 and the card is clasped between the two pairs of elastic pieces 6, keeping a steady situation, regardless of the electrical card connector shaking.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector for use with an electronic card, comprising:
    an insulative hosing unitarily forming a base and a pair of side arms commonly defining a card receiving cavity;
    a plurality of contacts disposed in the base;
    each of said side arms defining at least one slit communicating with the card receiving cavity and extending upwardly through an upper face of the corresponding side arm;
    a metallic elastic piece downwardly assembled into the slit from said upper face of each said side arm with thereof a distal end extending into the card receiving cavity; and
    a metallic shell assembled upon the housing and covering the upper face of each said side arm to prevent withdrawal of the elastic piece from the corresponding slit under a condition that said elastic piece is only allowed to be disassembled from the corresponding slit via said upper face after removal of said shell from the housing; wherein
    said elastic piece is moveable in a transverse direction toward the corresponding side arm when said electronic card is inserted into the card receiving cavity in an insertion direction perpendicular to said transverse direction.

2. The electrical card connector as claimed in claim 1, wherein each of said side arms defines a receiving channel to receive the deflected elastic piece when said electronic card is inserted into the card receiving cavity.

3. The electrical card connector as claimed in claim 1, wherein said slit extends through a side face of the corresponding side arm.

4. The electrical card connector as claimed in claim 3, wherein said shell covers the side face of the side arm.

* * * * *